Patented June 20, 1933

1,914,406

UNITED STATES PATENT OFFICE

KARL DAIMLER, OF FRANKFORT-ON-THE-MAIN-HOCHST, GERMANY, ASSIGNOR, BY MESNE ASSIGNMENTS, TO GENERAL ANILINE WORKS, INC., OF NEW YORK, N. Y., A CORPORATION OF DELAWARE

FIRE-PREVENTING AND FIRE-EXTINGUISHING AGENT

No Drawing. Application filed December 4, 1928, Serial No. 323,797, and in Germany December 10, 1927.

The present invention relates to new fire-preventing and fire-extinguishing agents.

It is known that inflammable bodies can be made fireproof by impregnating them with sodium sulfate, ammonium sulfate, ammonium bromide, sodium bicarbonate, phosphates, borates or the like.

I have now found that by adding to the above mentioned or similar dressing and impregnating agents, which are to be used in an aqueous state, a small quantity of an alkylated or aralkylated sulfonic acid or of a water-soluble salt thereof, both the penetration of the aqueous solutions into the inflammable bodies and the drying of the latter is greatly facilitated while the bodies are at the same time rendered considerably more fire-proof.

Furthermore I have made the observation that the addition of the above mentioned sulfonic acids or their salts to fire-extinguishing agents, to be used in the form of an aqueous solution or emulsion, improves their efficiency and stability. If for instance a sodium salt of the said kind is added to a mixture of iron salts and sodium carbonate capable of forming foam by itself, the properties of said foam, in particular its stability and resistance to heat, are extremely improved, whereby the efficiency of the foam-mixture in extinguishing fires is considerably intensified. I have also found that when one of the above-mentioned sulfonic acids or their salts are added to the already known fire-extinguishing emulsions, for instance, to a carbon tetrachloride emulsion in water, which very often become resolved before or while they are used for the purpose in question, these emulsions are brought into a more stable and considerable more efficacious and fire-resisting form.

The following examples serve to illustrate my invention but they are not intended to limit it thereto:

(1) 90 parts of ammonium chloride and 10 parts of ammonium benzylnaphthalenesulfonate prepared from one molecular proportion of naphthalene, one molecular proportion of benzylchloride, 2 molecular proportions of sulfuric acid and neutralization of the product of the reaction by means of ammonia) are intimately mixed, the resulting mixture being used as a dressing and impregnating agent for making the material in question fire-proof. The impregnation is effected by dipping the substances to be made fire-proof into a bath of 20% strength, or by applying a 10% to 20% solution with a brush upon the surface of the material to be made fire-proof. The thorough impregnation of wood is done with a solution of 20% strength while applying pressure or pressure and a vacuum alternately. After the material has been impregnated, it is dried.

(2) An extinguishing foaming powder is prepared by mixing 56 parts of commercial aluminum sulfate, 42 parts of commercial sodium bicarbonate and 2 parts of sodium butylnaphthalenesulfonate (obtainable by means of 2 molecules of butyl alcohol, one molecule of naphthalene and 6 molecules of sulfuric acid with the addition of so much of a caustic soda solution as is necessary for the neutralization of the reaction product after this has been freed from the excess of sulfuric acid). In order to render the said extinguishing powder fit for use, it is mixed with water, which is preferably done in a suitable foam-generator intercalculated into the foam conduit. The powder may, however, also be used for filling therewith hand fire-extinguishers of known construction, in which case the access to the powder of the water, which is also contained in the extinguisher, is effected only at the moment when the extinguisher is used. Another method of using the substances in question is to dissolve the bicarbonate and the aluminum sulfate separately, while adding the sulfonate to one of the solutions or to both solutions, then storing these solutions separately and, in case of an outbreak of fire, to mix them with each other whereby the foam is produced which is then projected on the fire.

(3) 2 parts of ammonium butylnaphthalenesulfonate are dissolved in 98 parts of carbon tetrachloride. This solution is dispersed in 10–100 parts of water so as to obtain an emulsion suitable for being used for fire-extinguishing purposes.

(4) 80 parts by weight of ammonium bromide are mixed with 20 parts by weight of the ammonium salt of a sulfonic acid prepared as follows: So-called "Edeleanu" extract (which extract constitutes the oily residue left in the extraction of petroleum, petroleum fractions, shale oil, oil from brown-coal tar or the like by treating the said substances with liquid $SO_2$ and allowing the latter to evaporate) is heated with an equal quantity by weight of chlorosulfonic acid to 30–40° C.; the mass is then diluted with a small quantity of water and neutralized by means of ammonia whereupon the resulting salt is dried and pulverized. The mixture thus obtained is employed for the preparation of baths with which objects, for instance coulisses or the like are impregnated in order to render them fire-proof. The objects may also be impregnated by sprinkling the solutions upon them for instance by means of a revolving spray.

The expression "known, water-compatible, fire-inhibiting substances", used in the appended claims, is intended to include those known fire inhibiting substances specifically mentioned in the foregoing description, i. e. sodium sulfate, ammonium chloride, ammonium sulfate, ammonium bromide, aluminum sulfate, sodium bicarbonate, phosphates, borates and carbon tetrachloride, and their equivalents. My new fire-preventing and fire-extinguishing agents are applied to the inflammable material in conjunction with water, either in solution or emulsion (hence "water-compatible"). Obviously, the above defined expression is not intended to include water itself.

I claim:

1. A fire-preventing and fire-extinguishing agent consisting of aluminum sulfate, sodium bicarbonate and sodium butylnaphthalene sulfonate.

2. As a fire-preventing and fire-extinguishing agent, a composition of matter comprising at least one of the known, water-compatible, fire-inhibiting substances and a compound of the general formula $R.SO_3.X$ wherein R stands for an alkylated or aralkylated aromatic residue and X stands for H, $NH_4$, Na or K, said composition being capable of forming aqueous solutions or emulsions.

3. As a fire-preventing and fire-extinguishing agent, a composition of matter comprising at least one of the known, water-compatible, fire-inhibiting substances and a compound of the general formula $R.SO_3.X$ wherein R stands for an alkylated or aralkylated naphthalene nucleus and X stands for H, $NH_4$, Na or K, said composition being capable of forming aqueous solutions or emulsions.

4. As a fire-preventing and fire-extinguishing agent, a composition of matter comprising at least one of the known, water-compatible, fire-inhibiting substances and sodium butyl naphthalene sulfonate, said composition being capable of forming aqueous solutions or emulsions.

In testimony whereof, I affix my signature.

KARL DAIMLER.